United States Patent
Kimura

[11] Patent Number: 5,901,607
[45] Date of Patent: May 11, 1999

[54] DRIVING MECHANISM USING A TOOTHED BELT AND GEARS TO TRANSLATE BETWEEN ROTARY AND LINEAR MOTION

[75] Inventor: Akira Kimura, Tokyo, Japan

[73] Assignee: Sony Corporation, Japan

[21] Appl. No.: 08/540,036

[22] Filed: Oct. 6, 1995

[30] Foreign Application Priority Data

Oct. 20, 1994 [JP] Japan .................................. 6-281363

[51] Int. Cl.[6] .......................... B23Q 5/027; F16H 19/06
[52] U.S. Cl. ........................................ 74/89.22; 74/89.21
[58] Field of Search ............................... 74/89.21, 89.22, 74/37

[56] References Cited

U.S. PATENT DOCUMENTS

| | | | |
|---|---|---|---|
| 4,556,141 | 12/1985 | Faitel | 74/37 X |
| 4,706,510 | 11/1987 | Zimmer | 74/89.21 |
| 5,198,736 | 3/1993 | Azuma et al. | 74/89.22 X |

FOREIGN PATENT DOCUMENTS

| | | | |
|---|---|---|---|
| 160923 | 11/1985 | European Pat. Off. | 74/89.21 |
| 2910373 | 9/1980 | Germany | 74/89.21 |
| 38 06 613 | 7/1989 | Germany . | |
| 39 35 690 | 2/1991 | Germany . | |

*Primary Examiner*—Charles A. Marmor
*Assistant Examiner*—Troy Grabow
*Attorney, Agent, or Firm*—Ronald P. Kananen

[57] ABSTRACT

A driving mechanism has a base member, a moving member, a rotatable first idler, a rotatable second idler, and a rotating member disposed between the first and second idlers. A power-transmission belt is disposed such that it contacts with the first idler, passes between the first idler and the rotating member, contacts with the rotating member, passes between the rotating member and the second idler and contacts with the second idler. A part of the belt contacts with the base member by the first idler and another part of the belt also contacts with the base member by the second idler. With this mechanism, rotational movement is converted to linear movement, and vice versa.

6 Claims, 9 Drawing Sheets

DRIVING MECHANISM USING A TOOTHED BELT AND GEARS TO TRANSLATE BETWEEN ROTARY AND LINEAR MOTION

BACKGROUND OF THE INVENTION

1. Field of the Invention

The present invention relates to driving mechanisms using belts for transmitting power.

2. Description of the Related Art

Driving systems using belts such as toothed belts, or belts, are frequently used in office machines and industrial robots. FIG. 9 shows such a conventional belt-drive mechanism. In FIG. 9, a slider 2 is secured to a toothed belt 1. The toothed belt 1 is disposed between a driving pulley 3 and a driven pulley 4. When the driving pulley 3 rotates, the belt 1 moves the slider 2 in the direction indicated by arrow X. The distance between the centers of the driving pulley 3 and the driven pulley 4 is called a stroke ST.

This slider driving system using a toothed belt has advantages such as low cost, few limitations against speed, and easy provision of a long stroke. Since the toothed belt is less rigid than a ball screw, however, precision in movement distances decreases due to friction or the stick-slip motion of a guide (not shown) and vibration tends to occur. The main reason for these drawbacks of the toothed belt is low rigidity of the belts. The rigidity of the belts decreases by half when the stroke is doubled, substantially restricting its applications.

FIG. 10 shows a ball screw, another conventional drive system. The spline 5 of the ball screw engages with the nut 7 of a slider 6. When a motor 8 drives the spline 5 such that the spline 5 rotates in the direction indicated by arrow R, the slider 6 moves in the direction of arrow X. A long ball screw is expensive. In addition, ball screws having various lengths have to be prepared to meet the required stroke. The maximum speed of a ball screw is restricted by the lead length and the critical revolution frequency.

SUMMARY OF THE INVENTION

Accordingly, it is an object of the present invention to provide a driving mechanism having the same rigidity and precision as a ball screw, which is very inexpensive, easily increased in length according to the required stroke, and has no limitation in the speed of the moving member the mechanism drives.

The above object of the present invention is achieved through the provision of a driving mechanism comprising a base member; a moving member movable against the base member; a rotatable first idler and a rotatable second idler provided on the moving member; a driving source provided on the moving member; a rotating member provided on the moving member, disposed between the first idler and the second idler, and rotated by the driving source; and a long power-transmission belt which is disposed such that the belt contacts with the first idler, passes between the first idler and the rotating member, contacts with the rotating member, passes between the rotating member and the second idler, and contacts with the second idler, and which contacts with the base member at its part by the first idler and contacts with the base member at another part by the second idler.

When the driving source operates, the rotating member rotates. Then, the power-transmission belt moves the moving member against the base member. This means that with the use of the rotating member and the power-transmission belt, the rotation of the rotating member is converted into linear movement on the base member along the path for the moving member.

The driving mechanism may be configured such that the rotating member is a pulley and the first idler and the second idler are rollers.

The driving mechanism may be configured such that the power-transmission belt is a toothed belt and a toothed belt engaging with the power-transmission belt is disposed on the base member along the direction in which the moving member moves.

The above object of the present invention is also achieved through the provision of a driving mechanism comprising: a base member; a moving member movable against the base member; a rotatable first idler and a rotatable second idler provided on the moving member; a rotating member disposed between the first idler and the second idler; and a long power-transmission belt which is disposed such that the belt contacts with the first idler, passes between the first idler and the rotating member, contacts with the rotating member, passes between the rotating member and the second idler, and contacts with the second idler, and which contacts with the base member at its part by the first idler and contacts with the base member at another part by the second idler.

When another driving means moves the moving member, the rotating member rotates. This means that the linear movement on the base member along the path of the moving member is converted to the rotation of the rotating member.

The driving mechanism may be configured such that the rotating member is a pulley and the first idler and the second idler are rollers.

The driving mechanism may be configured such that the power-transmission belt is a toothed belt and a toothed belt engaging with the power-transmission belt is disposed on the base member along the direction in which the moving member moves.

The driving mechanism may further comprise driving means for linearly moving the moving member on the base member.

DETAILED DESCRIPTION OF THE PREFERRED EMBODIMENTS

Figure 1:
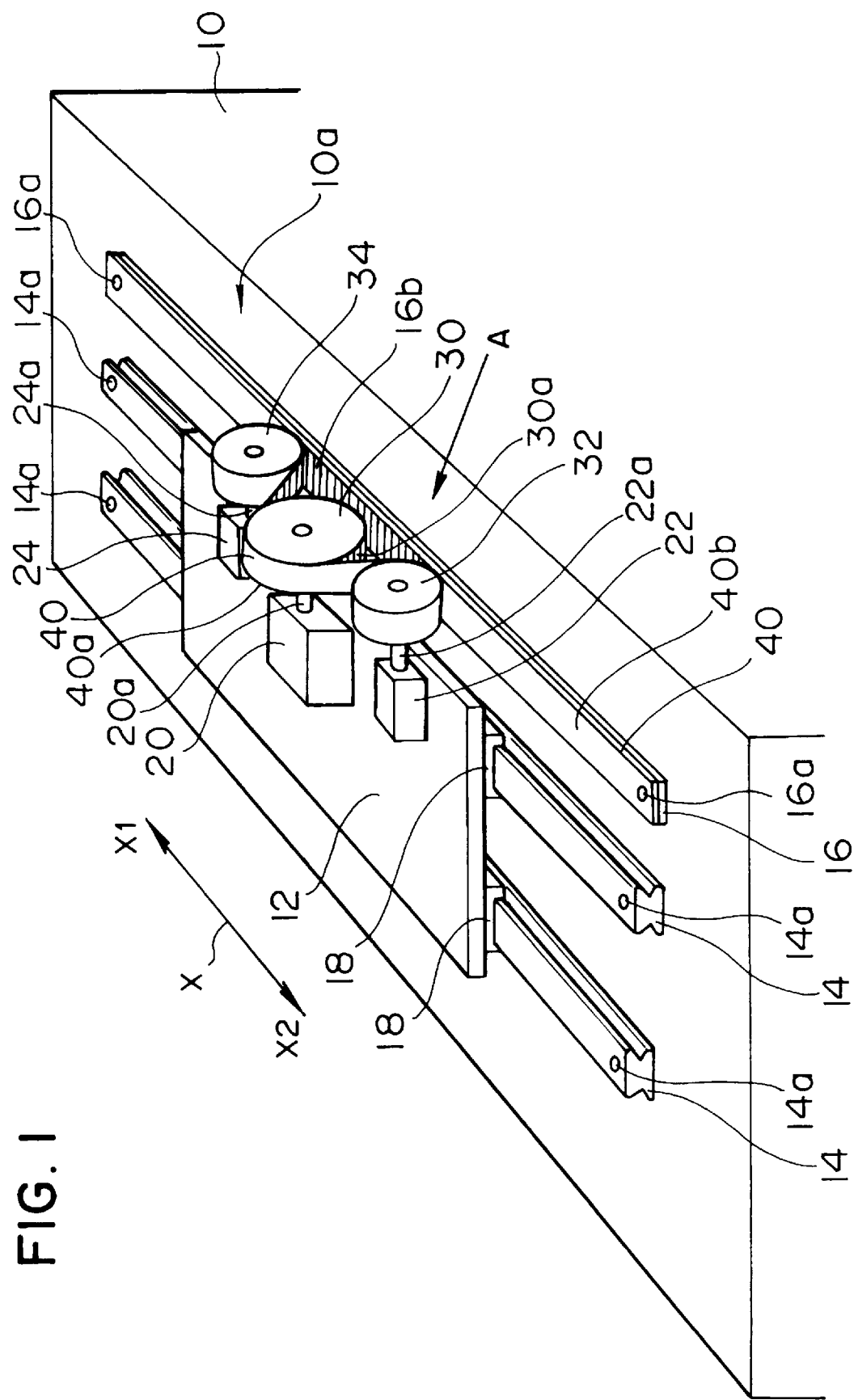
FIG. 1 is a perspective view of a driving mechanism according to a first preferred embodiment of the present invention.

Preferred embodiments of the present invention will be described in detail by referring to the accompanying drawings. In the drawings, the same symbols denote the same or corresponding components. Since embodiments described below are preferred embodiments of the present invention, various technical limitations are applied. It is to be understood that the invention is not limited to the disclosed embodiments unless the following description restricts the invention.

First Embodiment

Figure 2:
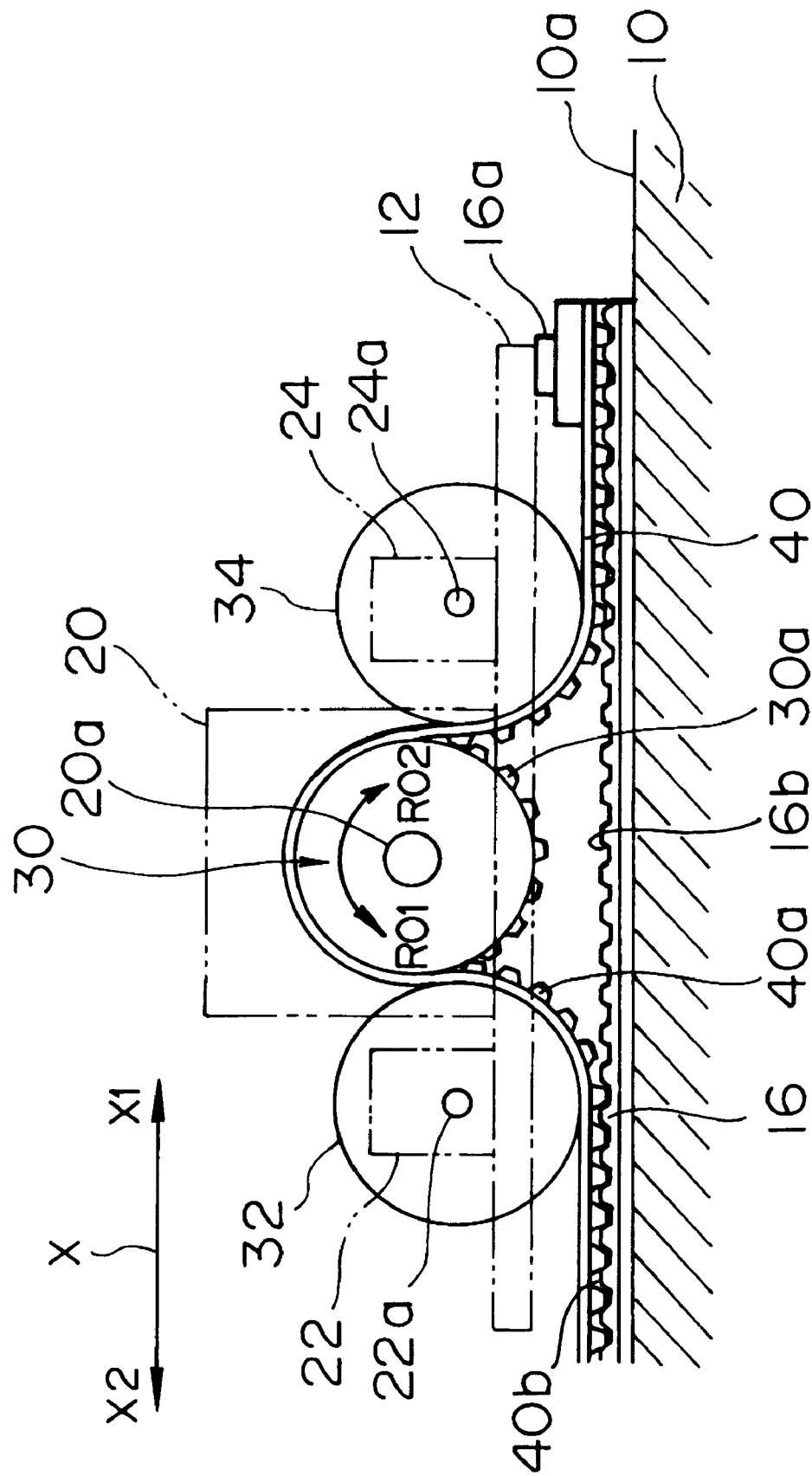
FIG. 2 is a side view of the main section of the driving mechanism of the first embodiment shown in FIG. 1.

FIG. 1 shows a driving mechanism according to a first preferred embodiment of the present invention. FIG. 2 is a view of part of the driving mechanism viewed from arrow A shown in FIG. 1.

A moving member 12 can linearly move on a base member 10 in FIGS. 1 and 2. On the upper plane surface 10a of the base member 10, two rails 14 and one toothed belt 16 are secured in parallel. The lengths of these rails 14 and the belt 16 are substantially the same in the longitudinal direction. The rails 14 serve as guiderails for linearly moving the moving member 12 in the direction of arrow X. The rails 14 and the belt 16 are disposed in parallel in the X direction. In the figures, there is shown teeth 16b on the upper surface of the belt 16. The rails 14 and the belt 16 are secured on the upper surface 10a of the base member 10 with, for example, screws 14a and 16a. The belt 16 is also secured to the upper surface 10a with adhesive.

Guide members 18 are secured to the lower surface of the moving member 12. These guides 18, integrally with the moving member 12, engage with the guiderails 14 and can move in the X direction. On the upper surface of the moving member 12, a motor 20, a rotation-type actuator, and two idler-supporting sections 22 and 24 are secured. The output shaft 20a of the motor 20, for example, a servo motor, is directly connected to a pulley 30 serving as a rotating member. As shown in FIGS. 1 and 2, the pulley 30 has teeth 30a on its peripheral surface. The teeth 30a are separate from the toothed belt 16, that is, floated from the belt as shown in FIG. 2.

A first idler 32 is mounted to the shaft 22a of the idler-supporting section 22. In the same way, a second idler 34 is mounted to the shaft 24a of the idler-supporting section 24. The first idler 32 and the second idler 34 are rotatable rollers.

The pulley 30 is disposed between the idlers 32 and 34. The idler 32, the pulley 30, and the idler 34 are aligned in line in the X direction such that the height of the shaft 22a is the same as that of the shaft 24a and the height of the shaft 20a is higher than those of the shafts 22a and 24a.

Another toothed belt 40 is disposed in the X direction such that it faces the toothed belt 16. One end of the belt 40 is secured with screws 16a together with one end of the belt 16. The other end of the belt 40 is secured with screws 16a together with the other end of the belt 16. The teeth 40a of the belt 40 engage with the teeth 16b of the belt 16. The belt 40 is longer than the belt 16. As shown in FIG. 2, the belt 40 is disposed such that it is nipped between the idler 32 and the pulley 30, and also between the pulley 30 and the idler 34. In other words, the belt 40 is disposed such that it contacts with the idler 32, passes between the idler 32 and the pulley 30, contacts with the pulley 30, passes between the pulley 30 and the idler 34, and contacts with the idler 34. The belt 40 engages with the belt 16 secured to the base member 10 at its part by the idler 2, and engages with the same at another part with the idler 34. The idler 32 presses the belt 40 against the belt 16. In the same way, the idler 34 presses the belt 40 against the belt 16.

The idler 32 contacts with the rear surface 40b of the toothed belt 40 by about one fourth of the circumference of the idler 32. In the same way, the idler 34 contacts with the rear surface 40b of the toothed belt 40 by about one fourth of the circumference of the idler 34. The teeth 40a of the belt 40 engage with the teeth 30a of the pulley 30 by about half of the circumference of the pulley 30.

Operation in the first embodiment shown in FIGS. 1 and 2 will be described below.

The moving member 12, a slider, is slidably supported by the guiderails 14, also called linear guides. When the motor 20 drives the slider 12 such that the pulley 30 rotates in the direction indicated by arrow R01 shown in FIG. 2, the slider 12 moves in the direction of arrow X1. Since the idlers 32 and 34 nip the upper and lower toothed belts 40 and 16 with the upper surface 10a of the base member 10, the teeth 40a and 16b of the belts 40 and 16 positively engage with each other, disabling the belts 40 and 16 to move relatively in the vertical direction. Because the belt 16, disposed at the lower side, is adhered to the base member 10, the belt 40, disposed below the idlers 32 and 34, cannot move relatively against the base member 10.

Assuming that an external force is applied to the slider 12 with the rotation of the pulley 30 being locked strongly, the belt 40 would be extended by this force by about one fourth of the circumference of the idlers 32 and 34. When the diameter of the idlers 32 and 34 is about 30 mm, the belt would be extended by 30×3.14÷4, about 24 mm.

Figure 9:
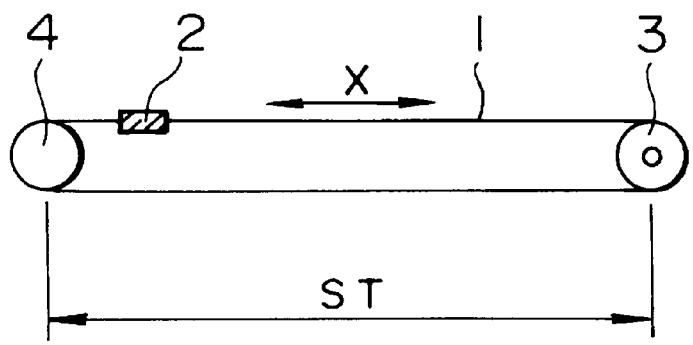
FIG. 9 shows a conventional belt-drive mechanism.
Figure 10:
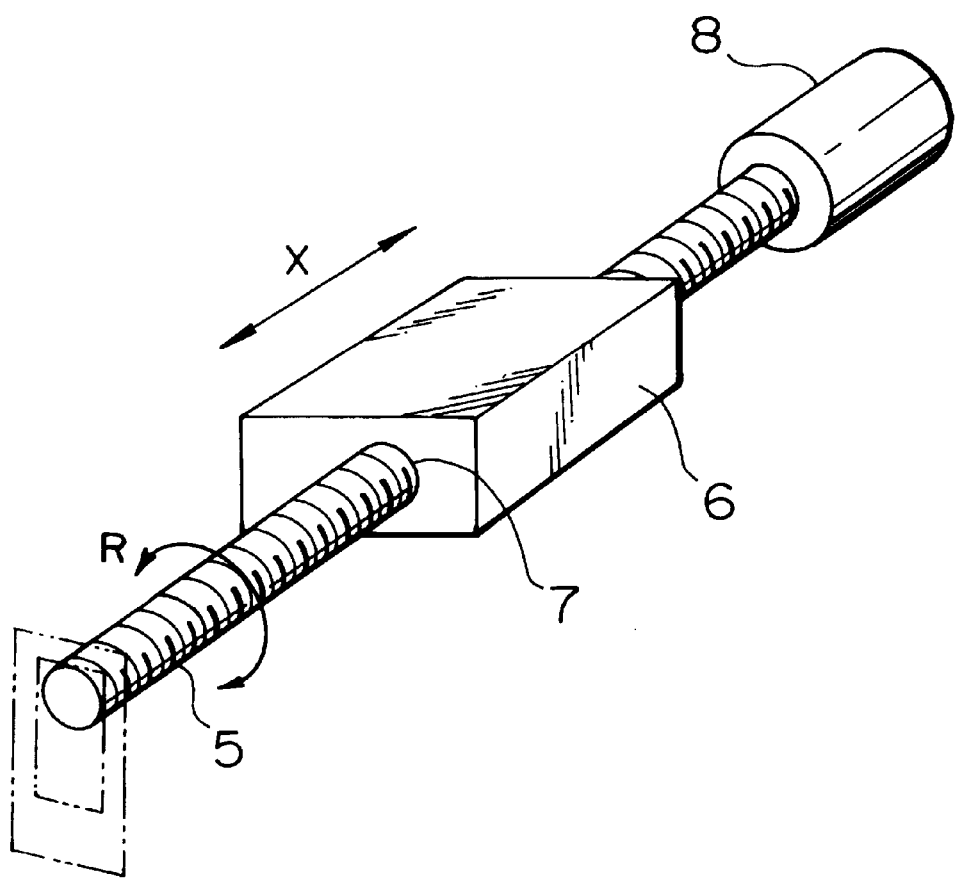
FIG. 10 shows a conventional ball-screw mechanism.

By contrast, when the same force is applied to a belt having a stroke ST of 400 mm in the conventional belt drive system shown in FIG. 9, the belt would be extended by about 500 mm. When the same types of toothed belts are used in the conventional belt drive mechanism and the drive mechanism according to the present invention shown in FIGS. 1 and 2, and the same force is applied to the sliders, the sliders in the conventional mechanism moves about 21 times (500 mm/24 mm) longer than that in the mechanism of the present invention. In the embodiment of the present invention, the extension of the toothed belt does not depend on the stroke. This means that, if the stroke is doubled, the difference in the extension of the belt between the conventional drive system and that of the present invention is also doubled, giving an advantage to the drive mechanism of the present invention as the stroke is extended.

The extension of the belt is a reciprocal of the rigidity of the belt. The belt used in the conventional belt drive mechanism has a stroke ST of 400 mm, which is almost the minimum stroke required for a usual industrial robot application.

As described above, the rigidity of the toothed belt in the embodiment of the present invention is increased about 20 times or more compared with that of the belt used in the conventional belt drive mechanism.

Second Embodiment

Figure 3:
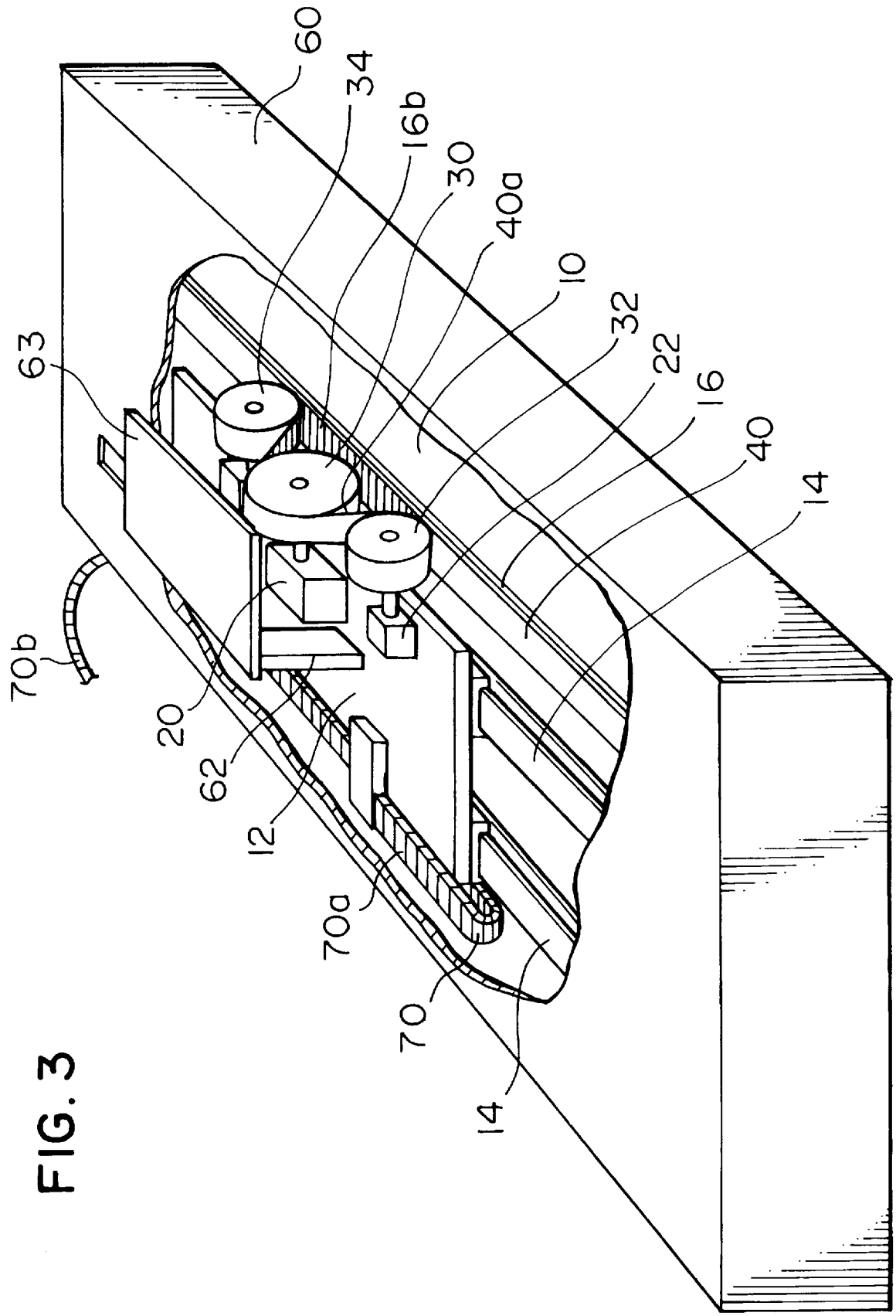
FIG. 3 is a perspective view of a driving mechanism according to a second embodiment of the present invention.

FIG. 3 shows a drive mechanism according to another embodiment of the present invention which is a modification of the first embodiment, shown in FIGS. 1 and 2.

FIG. 3 illustrates a linearly moving robot. The base member shown in FIG. 1 corresponds to a robot body. The robot body 10 is covered with a case 60. A moving member (slider) 12 has a column 62 on which a plate 63 is mounted. One end 70a of a flexible wire 70 is connected to the slider 12, and the other end 70b is led to the outside of the case 60. A motor 20 supplies power through the wire 70. The other structure and operation of this driving mechanism is the same as that described in the first embodiment.

Third Embodiment

Figure 4:
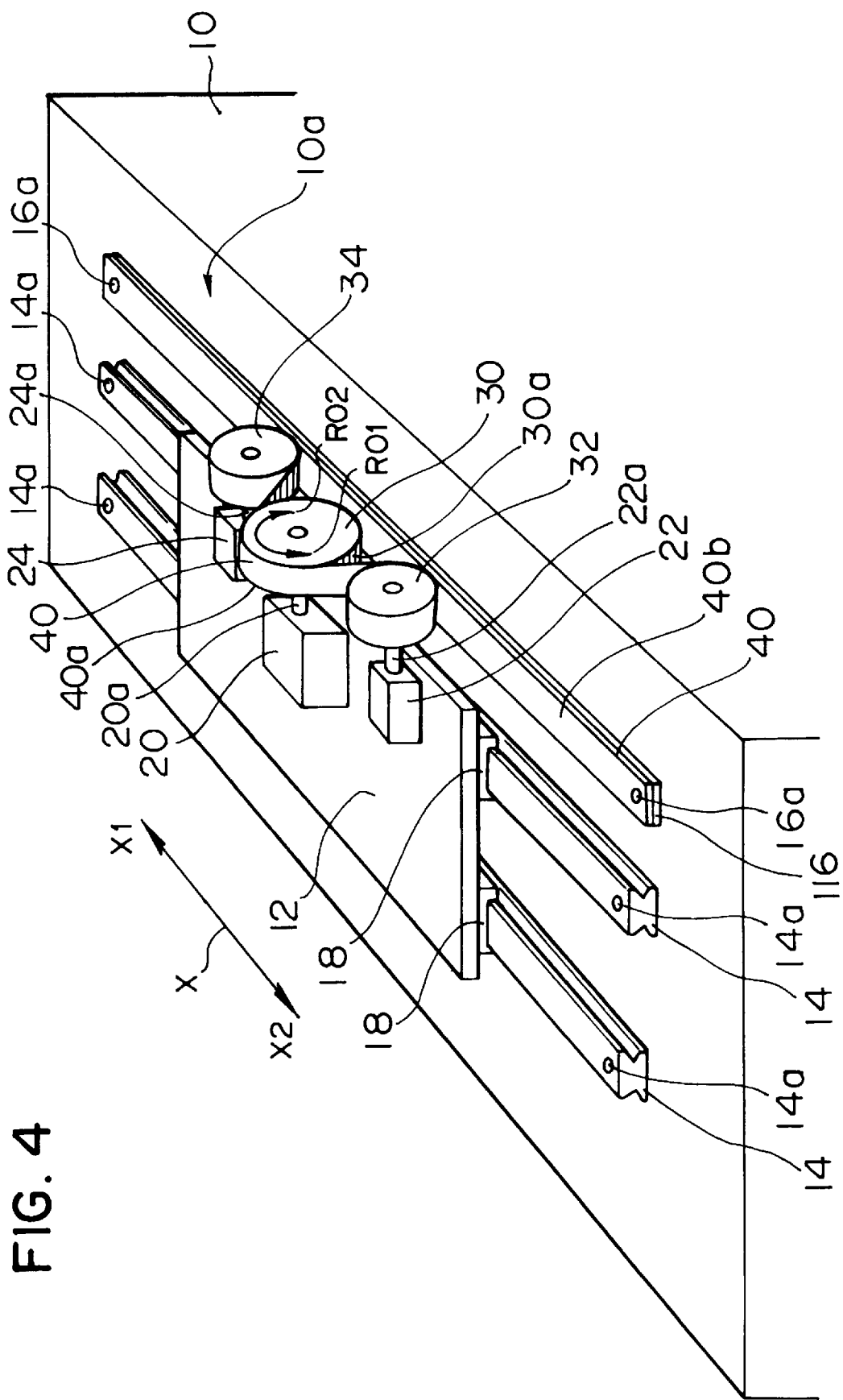
FIG. 4 is a perspective view of a driving mechanism according to a third embodiment of the present invention.

FIG. 4 shows a drive mechanism according to a third embodiment of the present invention. The embodiments shown in FIGS. 1 and 3 use one pair of the toothed belts 40 and 16 such that their teeth 40a and 16a engage with each other. By contrast, the third embodiment shown in FIG. 4 uses a plane belt 116 and a toothed belt 40 which is the same as the toothed belt 40 shown in FIGS. 1 and 3. The plane belt 116 does not have teeth and is adhered to the upper surface 10a of a base member 10 with adhesive. The toothed belt 40 is secured together with the plane belt 116 by screws 16a. The belt 40 is longer than the belt 16 in the direction of arrow X. The belt 40 is disposed in association with a pulley 30 and idlers 32 and 34 in the same way as for the embodiments shown in FIGS. 1 and 3. The pulley 30 has teeth 30a, which engage with the teeth 40a of the belt 40.

In the third embodiment, when a motor 20 is driven such that the pulley 30 rotates in the direction indicated by arrow R01, the slider 12 moves in the X1 direction. When the motor 20 is reversed such that the pulley 30 rotates in the R02 direction, the slider 12 moves in the X2 direction.

Since the idlers 32 and 34 presses the belt 40 against the belt 116, the belt 40, disposed below the idlers 32 and 34, cannot move relatively against the base member 10. In other words, the slider 12 can be moved in the X1 or X2 direction without slide.

It is preferred that materials having as large friction as possible be used for the toothed belt 40 and the plane belt 116.

Fourth Embodiment

Figure 5:
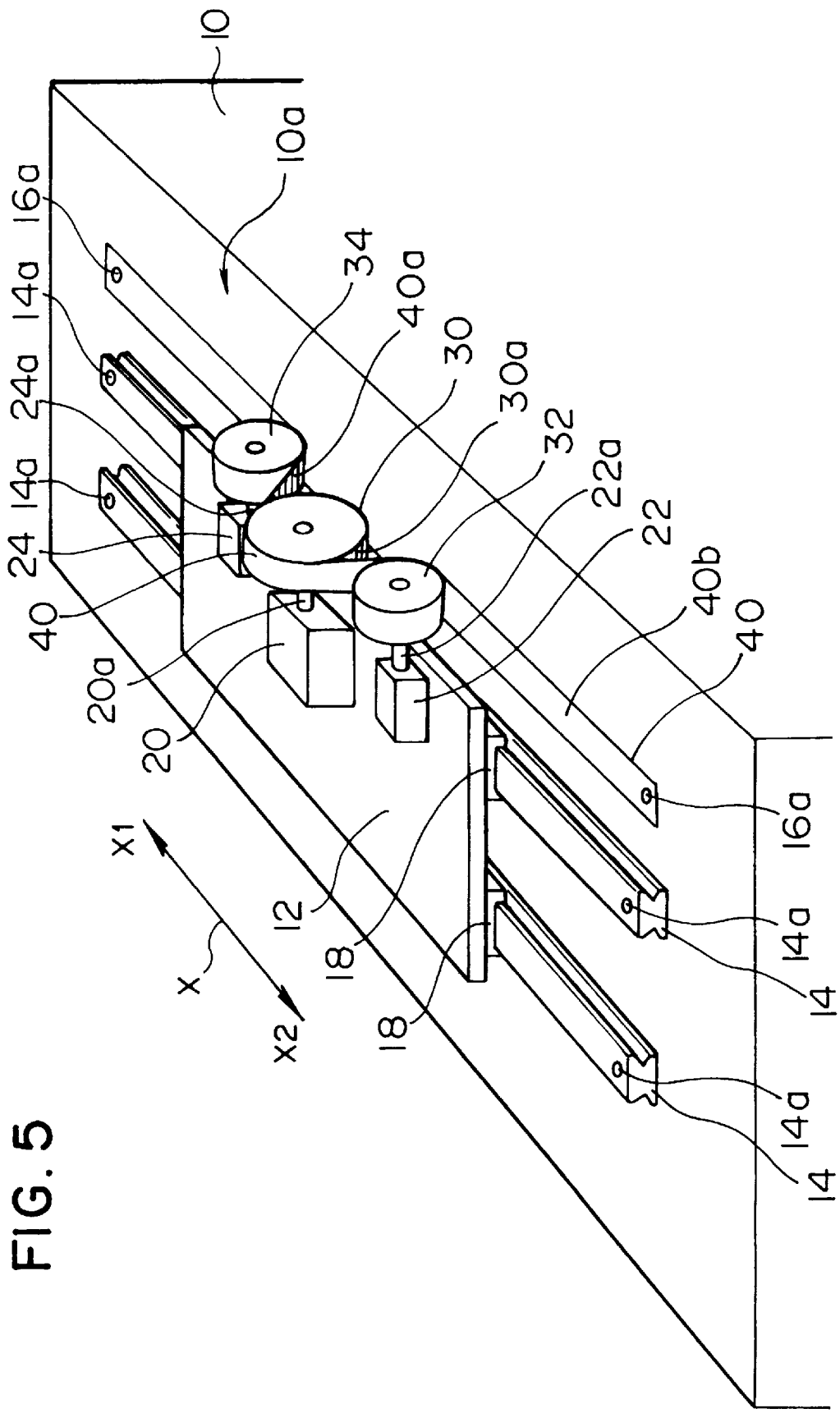
FIG. 5 is a perspective view of a driving mechanism according to a fourth embodiment of the present invention.

FIG. 5 shows a fourth embodiment of the present invention. In this embodiment, neither a plane belt such as the belt 116 shown in FIG. 4 nor a toothed belt 16 such as the belt 16 shown in FIGS. 1 and 3 is disposed on the upper surface 10a of the base member 10. Only a toothed belt 40 is secured with screws 16a on the upper surface 10a of the base member 10. This belt 40 is disposed in association with a pulley 30, and idlers 32 and 34 in the same way as for the embodiments described in FIGS. 1 to 4. The pulley 30 has teeth 30a, which engage with the teeth 40a of the belt 40. Driving a motor 20 linearly moves the slider 12 in the X1 or X2 direction.

The embodiment shown in FIG. 5 uses the toothed belt 40. A plane belt may be used. When either the toothed belt 40 or a plane belt is used, it is preferred that the mechanism is configured such that friction between the belt and the upper surface 10a of the base member 10 is generated. A plane rubber plate may be adhered to the surface 10a of the base member 10.

Fifth Embodiment

Figure 6:
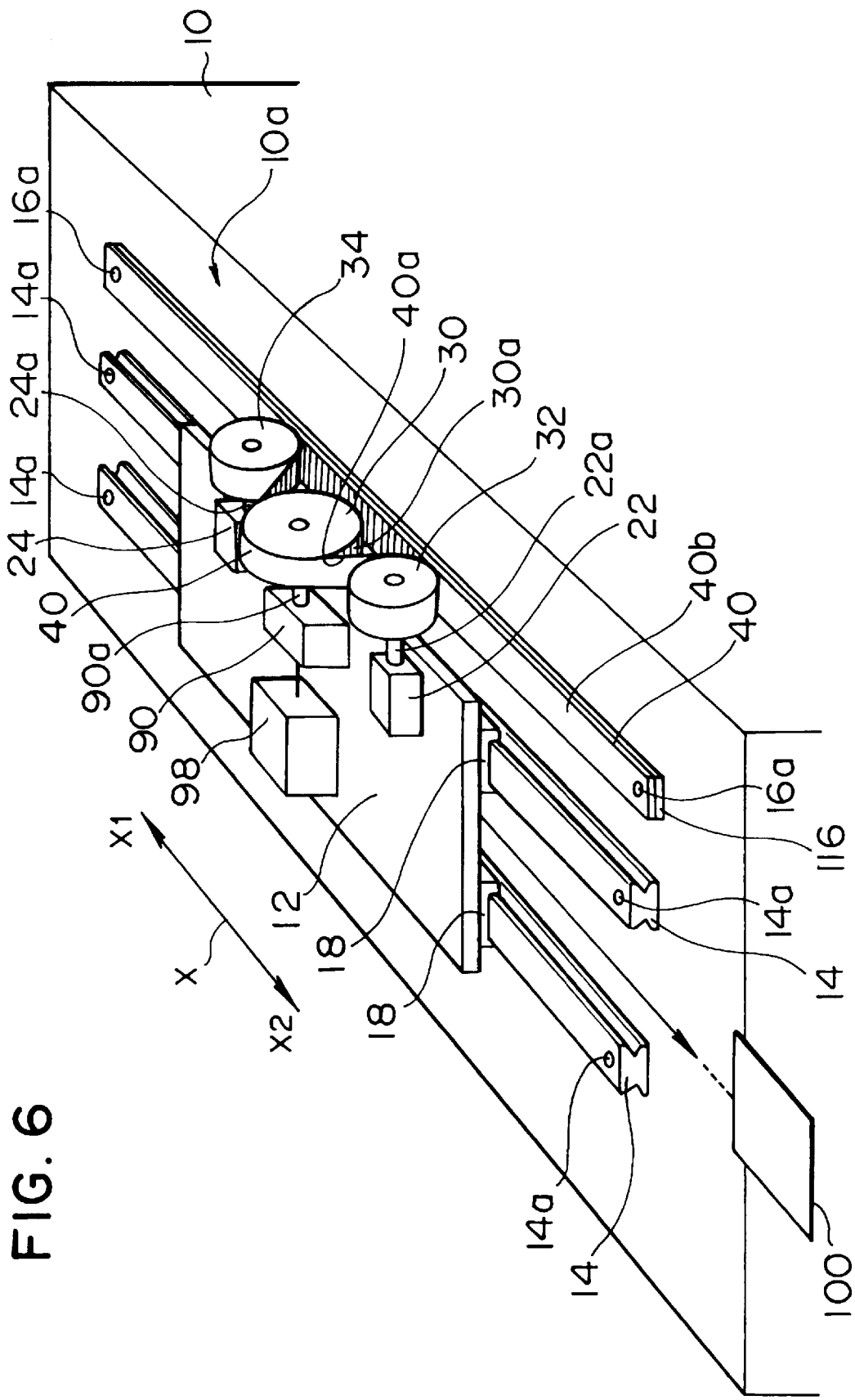
FIG. 6 is a perspective view of a driving mechanism according to a fifth embodiment of the present invention.

FIG. 6 shows a drive mechanism according to a fifth embodiment of the present invention. The embodiment shown in FIG. 5 differs from that shown in FIGS. 1 and 2 in that the slider 12 is not provided with a motor. Instead, a pulley supporting member 90 is provided on the slider 12. The shaft 90a of the pulley supporting member 90 rotatably supports the pulley 30. Driving means 100 for sliding the slider 12 in the X1 and X2 directions are provided for the base member 10.

When the driving means 100 moves the slider 12 in the X direction, the pulley 30 rotates. The toothed belt 40 contacts with the idler 32, passes between the idler 32 and the pulley 30, contacts with the pulley 30, passes between the pulley 30 and the idler 34, and contacts with the idler 34. Part of the belt 40 engages with part of the teeth 16a of the secured belt 16 by the idler 32. Another part of the belt 40 engages with another part of the teeth 16a of the belt 16 by the idler 34. With this configuration, relative movement along the path of the slider 12 on the upper surface 10a of the base member 10 can be converted to the rotation of the pulley 30, enabling an object 98 to rotate. The rigidity in the connection between the pulley 30 and the upper surface 10a of the base member 10 along the path is increased with mechanical connection by winding the belt 40 around the pulley 30 and by pressing the belt 16 against the upper surface 10a of the base member 10.

Sixth Embodiment

Figure 7:
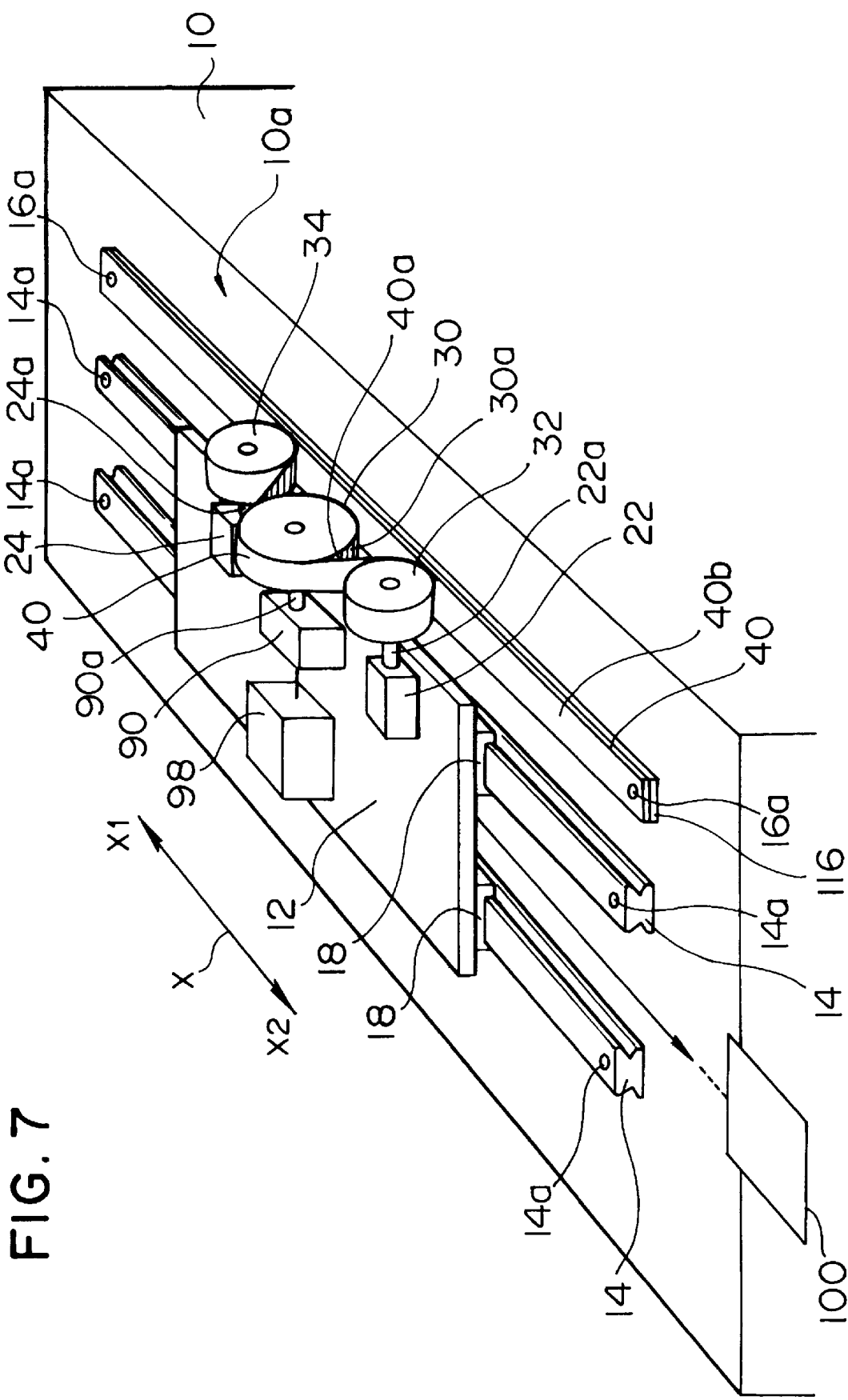
FIG. 7 is a perspective view of a driving mechanism according to a sixth embodiment of the present invention.

FIG. 7 shows a sixth embodiment of the present invention. The sixth embodiment corresponds to the third embodiment. A toothed belt 40 and a plane belt 116, which is secured to the upper surface 10a of a base member 10 with adhesive, are provided.

A slider 12 is provided with a pulley-supporting member 90 in the same way as for the fifth embodiment. The slider 12 can move in the X1 and X2 directions by driving means 100. When the slider moves, a rotation force is generated at a pulley 30, operating an object 98. The object 98 can be a generator or an encoder.

Seventh Embodiment

Figure 8:
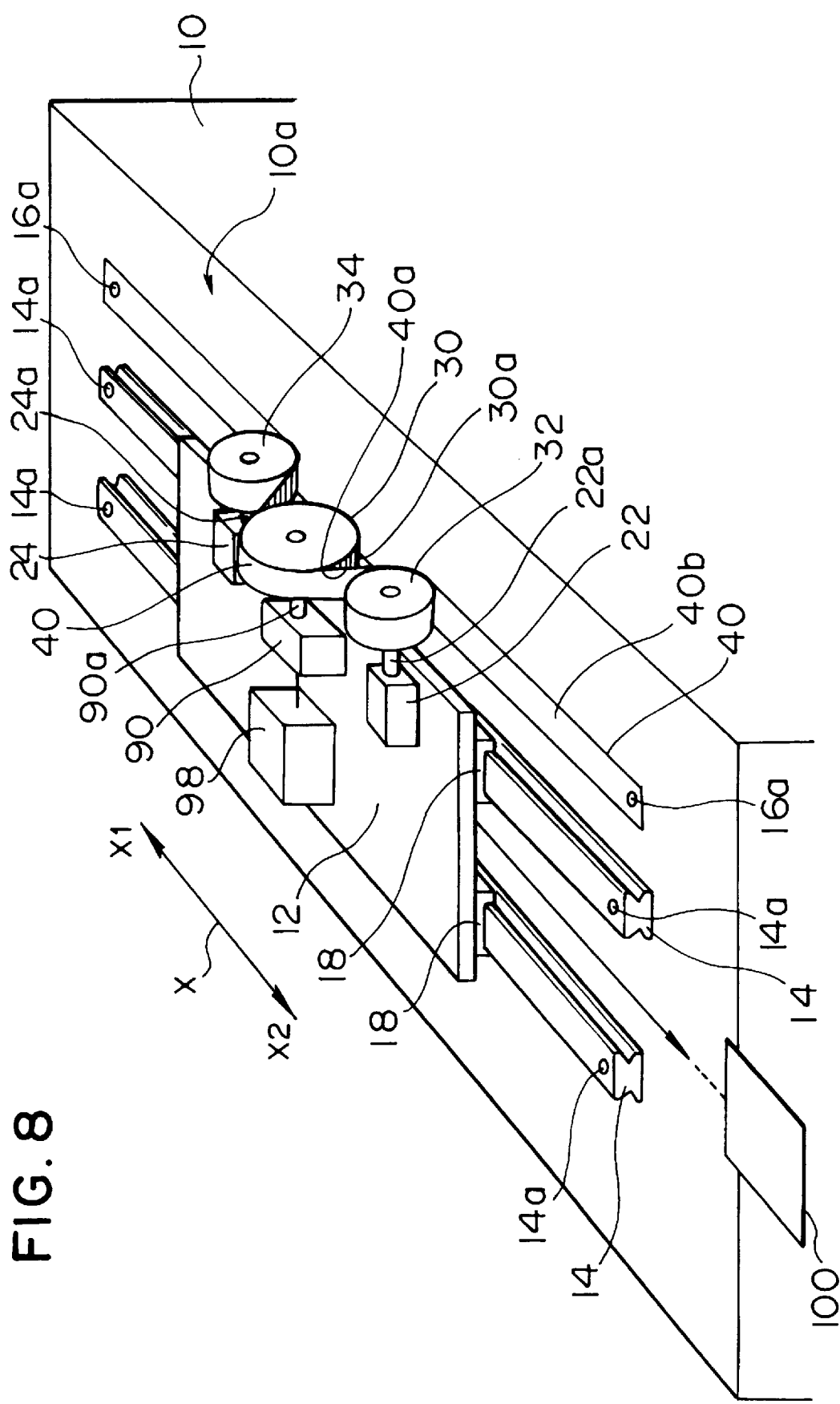
FIG. 8 is a perspective view of a driving mechanism according to a seventh embodiment of the present invention.

FIG. 8 shows a driving mechanism according to a seventh embodiment of the present invention. The seventh embodiment corresponds to the fourth embodiment. A toothed belt 40 is mounted on the upper surface 10a of a base member 10 with screws 16a. The teeth 30a of a pulley 30 engage with the teeth 40a of the belt 40.

Operating driving means 100 moves a slider 12 in the X1 or X2 direction.

In the seventh embodiment, the toothed belt 40 is used. A plane belt may be used.

When either the toothed belt 40 or a plane belt is used, it is preferred that friction between the belt and the upper surface 10a of the base member 10 be of an appropriate amount. A plane rubber plate may be adhered to the upper surface 10a of the base member 10.

It is to be understood that the present invention is not limited to the above embodiments. In the embodiments described above, a combination of the toothed belts 40 and 16, a combination of the toothed belt 40 and the plane belt 116, and the toothed belt 40 only are used. Two plane belts may be used in the first embodiment, shown in FIG. 1. In that case, the pulley 30 may have no teeth 30a.

The driving mechanisms described in the above embodiments of the present invention can be particularly applied to linearly moving robots. Compared with ball screws, which are conventionally used as linear movement means in linearly moving robots, the driving mechanisms of the present invention have the following advantages in addition to having the same rigidity and precision as ball screws.

Providing merits in a belt-drive mechanism using toothed belts and plane belts, the driving mechanisms of the present invention improves rigidity in driving.

The driving mechanisms of the present invention are very inexpensive and unlike ball screws do not require various series having different lengths. In other words, belts are cut according to the required length and adhered to the base member. A linearly moving mechanism is easily manufactured at low cost.

Since the length of a belt is easily adjusted, the stroke of a moving member (slider) is readily increased or reduced. In addition, unlike a ball screw, the maximum moving speed is not limited. The driving mechanisms of the present invention provide the maximum moving speed twice or more as high as that of ball screws over the entire stroke.

The driving mechanisms of the present invention can be applied to various fields, such as toys, in addition to office machines and industrial robots.

It is needless to say that various shapes of belts, such as belts having a cross section of a V shape and belts having a cross section of a semi-circle, can be used in addition to toothed belts and plane belts.

Belts may be made of any materials which provide the belts with friction, such as rubber and plastics, which are usually used.

As described above, the present invention provides driving mechanisms having the same rigidity as ball screws, which are very inexpensive, easily increased in length according to the required stroke, and have no limitation in the speed of the moving member the mechanisms drive.

What is claimed is:

1. A driving mechanism comprising:
   a base member;
   a moving member movable against said base member;
   a rotatable first idler and a rotatable second idler provided on said moving member;
   a rotating member disposed between said first idler and said second idler, and having a shaft extending therefrom to transmit rotary motion of said rotating member to a rotating object;
   a linear drive means for causing said moving member to move in a linear direction; and
   a belt which is disposed such that said belt contacts with said first idler, passes between said first idler and said rotating member, contacts with said rotating member, passes between said rotating member and said second idler, and contacts with said second idler, and which contacts with said base member at its part by said first idler and contacts with said base member at another part by said second idler;
   wherein when said linear drive means causes said moving member to move, said rotating member is caused to rotate along said belt thereby causing said rotating object to rotate.

2. A driving mechanism according to claim 1, wherein said rotating object is an encoder.

3. A driving mechanism according to claim 1, wherein said rotating object is a generator.

4. A driving mechanism according to claim 1, wherein said rotating member is a pulley and said first idler and said second idler are rollers.

5. A driving mechanism according to claim 1, further comprising:
   two parallel rails disposed on said upper surface of said base member; and
   two parallel guide members disposed on a bottom surface of said moving member, said moving member resting on said two parallel rails such that said two parallel guide members contact and slide along said rails.

6. A driving mechanism according to claim 1, wherein said belt is a toothed belt and is engaged with a second toothed belt which is disposed on said base member along the direction in which said moving member moves.

* * * * *